July 2, 1929.  F. A. HOLKE  1,719,430
AUTOMATIC ADJUSTMENT FOR BEARINGS
Original Filed April 8, 1922
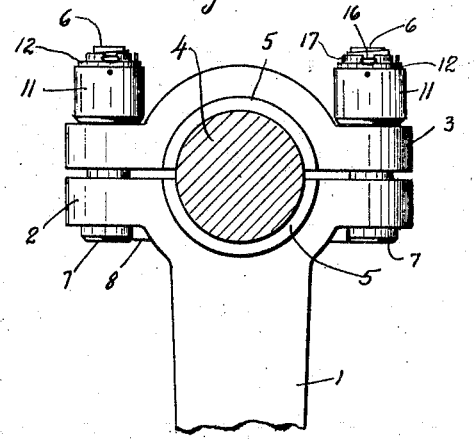
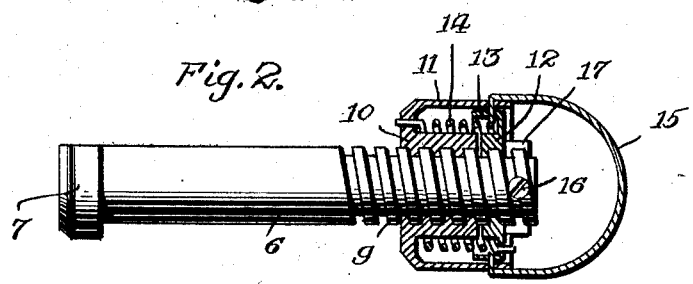
Frank A. Holke,
INVENTOR.
BY
Walter N. Haskell,
his ATTORNEY.

Patented July 2, 1929.

1,719,430

UNITED STATES PATENT OFFICE.

FRANK A. HOLKE, OF ROCK ISLAND, ILLINOIS, ASSIGNOR, BY MESNE ASSIGNMENTS, TO VEC PRODUCTS COMPANY, OF CEDAR RAPIDS, IOWA, A CORPORATION OF IOWA.

AUTOMATIC ADJUSTMENT FOR BEARINGS.

Refiled for abandoned application Serial No. 550,889, filed April 8, 1922. This application filed November 30, 1923. Serial No. 677,823.

My invention has reference to automatic adjustments for bearings, and is an improvement on similar devices wherein a bolt is fitted on its threaded end with a nut and collar united by a tension spring, means being provided for locking the nut and collar from movement, with the spring under tension.

This was done by inserting a pin in openings in the nut, collar, and bolt upon which they were seated. This was not found to be satisfactory, however, on account of the difficulty in determining the position of the opening in the bolt, and getting the other openings to register therewith.

One of the purposes of the present invention is to overcome this difficulty by providing a sectional nut, the parts of which will act together as a unit on the threads of the bolt, when such parts are in proper relation with each other, and to provide means for holding them in such desired relation.

Another purpose of the invention is to provide a more perfect shield for the operative parts of the device, to protect them from the incursion of oil and other injurious substances.

The foregoing and other features and advantages of the invention will be more fully understood from the following specification, reference being had to the accompanying drawings, in which:

Fig. 1 shows a portion of the connecting rod of an engine, with the invention in use thereon.

Fig. 2 is a detail of one of the devices, partly in longitudinal section.

1 represents a fractional part of a connecting rod of common form, provided at one end with a sectional bearing 2, for operation with a similar bearing 3, the bearings being fitted to receive a shaft 4, a bushing 5 being interposed between the shaft and bearings in the usual manner. The ends of the bearings are united by bolts 6, having heads 7, cut away at one side to form a bearing against lugs 8 on the part 2, to prevent such bolts from turning in their seats.

On the threaded end 9 of each of the bolts is a main nut 10, provided with a shell extension 11, spaced apart from the main portion or hub of the nut. On the end of the bolt is a smaller anchor nut 12, having an annular flange 13, capable of being telescoped within the end of the shell 11. The parts 10 and 12 are united by a coiled spring 14, which is fully enclosed by the shell 11 and flange 13. When said parts 10 and 12 are in juxtaposition, as shown in Fig. 2, the spring 14 possesses a torsion force, or tension, having a tendency to move one of said parts with relation to the other one thereof, on the thread 9. When the parts are in position as shown they form a sectional nut, the parts of which can be operated on the thread as a unit, said parts being adapted to be held in such position with relation to each other, by means of a spring clip 15, the ends of which enter openings in the shell 11 and flange 13, and hold such parts from movement independently of each other.

The nut 12 can be held from rotation by means of a pin 16 passing through an opening in the end of the bolt 6, and in engagement at its ends with recesses in the castellated extension 17 of the nut 12.

The nut is positioned on the bolt while the parts thereof are held together by the clip, said parts being turned upon the thread until the inner end of the section 10 is in contact with the bearing 3. The section 12 is then secured to the bolt by means of the pin 16, and the clip 15 released, the tension of the spring 14 operating to hold the nut 10 tightly against the bearing 3. When the bushing 5 is new the parts 2 and 3 are slightly separated, as shown, but as the bushing becomes worn, there is a tendency of such parts to draw together, resulting in looseness and pounding thereof. This is overcome, however, by the expansion of the nut, or the follow-up action of the part 10. The degree of separation of the parts 10 and 12, under action of the spring 14, is comparatively limited, the overlapping of the shell 11 and the flange 13 being sufficient to prevent exposure of the spring at all times.

It will be observed that the parts of the device are in compact form, the end of the shell 11 being approximately flush with the face of the nut 12 when the parts are in close relation, as in Fig. 2. By this arrangement the shell does not project to such a distance as to render the same liable to strike against the casing of the crank-shaft or appurtenant parts.

By locking the sections of the nut in unitary relation, they can be easily placed in position on the bolt, even by unskilled persons, and from a position beneath the engine, if the work has to be done in that way.

When the nut sections are in juxtaposition, as in Fig. 2, the body portions or hubs thereof form a continuous seat for the spring 14, and there is plenty of space between such hub and the shell 11 for expansion of the coils of the spring which sometimes results from the expansion of the nut.

What I claim, and desire to secure by Letters Patent, is—

1. In a device of the character described, a main nut, an anchor nut, a spring connected to said nuts and tending to cause relative rotation therebetween, said nuts having the same thread whereby they may be threaded on a bolt having a single thread, and being further provided with apertures to receive a key to hold them against relative rotation with said spring under tension.

2. In a device of the character described, a main nut, an anchor nut, said nuts having the same thread whereby they may be threaded upon a bolt having a single thread, means for fastening said lock nut to a bolt, a spring connected to said nuts and tending to cause relative rotation therebetween, and a key engaging in recesses in said nuts to hold them against relative rotation with said spring under tension.

3. In a device of the character described, a main nut, an anchor nut telescoping therewith, a coiled spring between said nuts operatively connected thereto and under tension, a key engaging said nuts to hold them in position with the spring under tension, and means preventing easy withdrawal of said key.

4. In a device of the character described, a main nut, an anchor nut completely telescoping therewith and fitting within the periphery thereof, a spring surrounding said nuts and under tension, and a key projecting into said nuts to prevent relative rotation therebetween.

5. In a device of the character described, a main nut, an anchor nut telescoping therewith, a spring surrounding said nuts and under tension, and a spring clip engaging said nuts to prevent relative rotation therebetween, said clip being provided with integral means to detachably hold it in place on said nuts.

6. In a device of the character described, a main nut, an anchor nut, a spring engaging said nuts and tending to cause relative rotation therebetween, and apertures in each of said nuts to engage a key to prevent such relative rotation.

7. In a device of the character described, a main nut, an anchor nut telescoping with said main nut, a helical spring surrounding portions of said nuts and operatively connected thereto to tend to cause relative rotation therebetween, said nuts being provided with apertures to receive a key to prevent such relative rotation.

8. A device of the class described, comprising a bolt, threaded at one of its ends; a pair of nuts operable independently on said thread, and adapted to be brought into relative positions to be operated thereon as a unit; a coiled spring uniting said nuts, and capable of exerting a torsion tension on one thereof with relation to the other; overlapping shell extensions integral with said nuts, and enclosing said spring; a removable spring clip connected to said shell extensions, to hold said nuts in unitary relation; and means for holding one of said nuts in fixed position on said bolt.

9. A device of the class described, comprising a bolt, threaded at one of its ends; a pair of nuts operable independently on said thread, and adapted to be brought into relative positions to be operated thereon as a unit; a coiled spring uniting said nuts, and capable of exerting a torsion tension on one thereof with relation to the other; a flange forming a casing on one of said nuts and enclosing the other; a spring clip provided with means capable of being sprung into and out of locking engagement with said nuts for holding them in unitary relation during such engagement; and means for holding one of said nuts in fixed position on said bolt.

In testimony whereof I affix my signature.

FRANK A. HOLKE.